United States Patent
Stewart et al.

(10) Patent No.: US 11,839,803 B2
(45) Date of Patent: Dec. 12, 2023

(54) SYSTEM AND PROCESS FOR RFID TAG AND READER DETECTION IN A RACING ENVIRONMENT

(71) Applicant: ORBITER, INC., Tacoma, WA (US)

(72) Inventors: Gregory M. Stewart, Tacoma, WA (US); David G. Baur, Sandia Park, NM (US)

(73) Assignee: Orbiter, Inc.

( * ) Notice: Subject to any disclaimer, the term of this patent is extended or adjusted under 35 U.S.C. 154(b) by 364 days.

(21) Appl. No.: 17/393,326

(22) Filed: Aug. 3, 2021

(65) Prior Publication Data

US 2022/0040550 A1    Feb. 10, 2022

Related U.S. Application Data

(60) Provisional application No. 63/061,024, filed on Aug. 4, 2020.

(51) Int. Cl.
| | |
|---|---|
| *A63B 69/00* | (2006.01) |
| *H04W 4/80* | (2018.01) |
| *A63B 71/06* | (2006.01) |
| *A63B 24/00* | (2006.01) |
| *G06K 7/10* | (2006.01) |

(52) U.S. Cl.
CPC ...... *A63B 69/0028* (2013.01); *A63B 24/0021* (2013.01); *A63B 71/06* (2013.01); *G06K 7/10376* (2013.01); *H04W 4/80* (2018.02); *A63B 2024/0025* (2013.01); *A63B 2225/20* (2013.01); *A63B 2225/54* (2013.01)

(58) Field of Classification Search
CPC . A63B 69/0028; A63B 24/0021; A63B 71/06; A63B 2024/0025; A63B 2225/20; A63B 2225/54; G06K 7/10376; G06K 7/10356; G06K 7/10425; H04W 4/80; G07C 1/24
See application file for complete search history.

(56) References Cited

U.S. PATENT DOCUMENTS

| | | | |
|---|---|---|---|
| 5,091,895 A | 2/1992 | Chatwin | |
| 5,140,307 A | 8/1992 | Rebetez | |
| 5,436,611 A | 7/1995 | Arlinghaus, Jr. | |
| 5,511,045 A | 4/1996 | Sasaki | |
| 5,696,481 A | 12/1997 | Pejas et al. | |
| 5,812,049 A | 9/1998 | Uzi | |
| 5,883,582 A | 3/1999 | Bowers | |

(Continued)

OTHER PUBLICATIONS

Race Result, "Race Result Track Box Passive Data Sheet," Web access on Oct. 19, 2021, <https://www.raceresult.com/en-us/support/documents.php>.

(Continued)

*Primary Examiner* — Omeed Alizada
(74) *Attorney, Agent, or Firm* — Orbiter, Inc.

(57) ABSTRACT

A racing tracking system and process includes one or more RFID-based tower units connected to a computer. Pairs of tower units may be positioned to provide redundancy of detection so that the front of a participant and the rear of a participant (where bibs may be worn) are detected. The redundancy of RFID-based tower unit detection of front and rear worn bibs assures that all bibs will be read, and improves on the accuracy of a participant's position being confirmed.

12 Claims, 9 Drawing Sheets

(56) References Cited

U.S. PATENT DOCUMENTS

| | | | |
|---|---|---|---|
| 6,204,813 B1 | 3/2001 | Wadell | |
| 6,340,932 B1 | 1/2002 | Rodgers | |
| 6,496,806 B1 | 12/2002 | Horwitz | |
| 6,512,478 B1 | 1/2003 | Chien | |
| 6,570,487 B1 | 5/2003 | Steeves | |
| 6,577,238 B1 | 6/2003 | Whitesmith | |
| 6,696,954 B2 | 2/2004 | Chung | |
| 6,703,935 B1 | 3/2004 | Chung | |
| 6,720,930 B2 | 4/2004 | Johnson | |
| 6,812,824 B1 | 11/2004 | Goldinger | |
| 6,839,027 B2 | 1/2005 | Krumm | |
| 6,888,459 B2 | 5/2005 | Stilp | |
| 6,952,157 B1 | 10/2005 | Stewart | |
| 6,963,270 B1 | 11/2005 | Gallagher, III | |
| 6,989,750 B2 | 1/2006 | Shanks | |
| 6,995,655 B2 | 2/2006 | Ertin | |
| 7,009,526 B2 | 3/2006 | Hughes | |
| 7,019,639 B2 | 3/2006 | Stilp | |
| 7,057,511 B2 | 6/2006 | Shanks | |
| 7,057,975 B2 | 6/2006 | Stobbe | |
| 7,508,739 B2 | 3/2009 | Paes | |
| 7,589,616 B2 | 9/2009 | Klatsmanyi | |
| 7,605,685 B2 | 10/2009 | Stewart | |
| 2003/0163287 A1 | 8/2003 | Vock | |
| 2003/0189484 A1 | 10/2003 | Rust | |
| 2004/0006445 A1 | 1/2004 | Paek | |
| 2005/0099269 A1 | 5/2005 | Diorio | |
| 2006/0020470 A1 | 1/2006 | Dobbs | |
| 2012/0223817 A1* | 9/2012 | Hansen | G06K 7/10039 340/10.33 |
| 2012/0319822 A1* | 12/2012 | Hansen | G06K 7/10475 340/10.1 |
| 2013/0300542 A1* | 11/2013 | Hansen | A63B 71/06 340/10.1 |
| 2016/0259952 A1* | 9/2016 | Van Rens | G06K 7/10366 |

OTHER PUBLICATIONS

Race Result, "Race Result Data Sheet Track Box," Web access on Oct. 19, 2021, <https://www.raceresult.com/en-us/support/documents.php>.

Race Result, "Race Result System Data Sheet," Web access on Oct. 19, 2021, <https://www.raceresult.com/en-us/support/documents.php>.

Agee Race Timing, "Agee Race Timing FX9600 Package" Web access on Oct. 19, 2021, <http://www.ageeracetiming.com/>.

Agee Race Timing, "Agee Race Timing FX5700 Package" Web access on Oct. 19, 2021, <http://www.ageeracetiming.com/>.

Agee Race Timing, "Agee Race Timing TR265 Package" Web access on Oct. 19, 2021, <http://www.ageeracetiming.com/>.

Agee Race Timing, "Agee Race Timing SensThys RaceKit-Pro Package" Web access on Oct. 19, 2021, <http://www.ageeracetiming.com/>.

"Alien Advanced RFID Academy," Alien Technology, Mar. 2005, 112 pages.

"Alien RFID Academy," Alien Technology, as early as Sep. 22, 2004, 331 pages.

"Alien Technology RFID Primer," Alien Technology Corporation, 2004, 61 pages.

"Annexe 1: Utilisation des Badgeurs DAG System," Pygmalyon S.A., undated but assumed to be Jul. 19, 2004, 11 pages.

"EPC™ Generation 1 Tag Data Standards Version 1.1 Rev 1.27," EPCglobal, Standard Specification, May 10, 2005, 37 pages.

"EPC™ Radio-Frequency Identity Protocols Class-1 Generation-2 UHF RFID Protocol for Communications at 860 MHz-960 MHz Version 1.0.9," EPCglobal, Specification for RFID Interface, Jan. 31, 2005, 94 pages.

"Instruction: System," DAG System™, Version 4, Jul. 9, 2004, 44 pages.

"Instructions: DAG Triathlon," DAG System™, Version 5, Jul. 23, 2004, 23 pages.

"Intermec System Manual: Intermec RFID," Intermec Technologies Corporations, 2005, 74 pages.

Karali, D., "Integration of RFID and Cellular Technologies," Wireless Internet for The Mobile Enterprise Consortium (Winmec), UCLA Anderson School of Management, Technical Report/White Paper UCLA-WINMEC-2004-205-RFID-M2M, Sep. 2004, 33 pages.

"New for 2005—BEST Racing Now Uses DAG Chip Timing," DAG, 2005, 5 pages.

O'Connor, M.C., "Alkien Debuts Gen 2 Interrogator," RFID Journal, <http://rfidjournal.com/article/articlepring/1777/-1/1/1>, Aug. 4, 2005[retrieved May 3, 2007] 2 pages.

Polster, Leider, Woodruff & Lucchesi, LC, "Summary of Material Prior Art Resulting from a Quick Search," Exhibit I, received Jul. 6, 2011, 2 pages.

Polster, Leider, Woodruff & Lucchesi, LC, "Summary of Material Prior Art Resulting from a Quick Search," Exhibit I, received Jul. 27, 2009, 3 pages.

"Reader Interface Guide: ALR-9780, ALR-9640 v2,1,0," Alien Technology, 2004, 87 pages.

Saponas, T.S., et al., "Devices That Tell on You: The Nike+iPod Sport Kit," Department of Computer Science and Engineering, University of Washington, Seattle, Nov. 30, 2006, <http://www.cs.washington.edu/research/systems/privacy.html>, 12 pages.

Seshagiri Rao, K.V., et al., "Antenna Design for UHF RFID Tags: A Review and a Practical Application," IEEE Transactions on Antennas and Propagation53(12):3840-3876, Dec. 2005.

"Trolleyponder/Ecotag RFID Newsletter, No. 51," Jan. 5, 2006, 2 pages.

"Tests on a Timing Module for Sports Timing," Trolley Scan Timing Module Brochure, Trolley Scan (Pty) Ltd, Jun. 2004, 3 pages.

"UHF Gen 2 System Overview," TI-RFid, Texas Instruments, Mar. 2005, 44 pages.

* cited by examiner

SYSTEM AND PROCESS FOR RFID TAG AND READER DETECTION IN A RACING ENVIRONMENT

BACKGROUND OF THE INVENTION

The embodiments of the present invention herein relate generally to racing detection systems, and more particularly to racing detection systems that provide a high level of precision as RFID tags attached to participants travel through a detection zone and across a line.

In many current racing detection systems, RFID detectable tags that are attached to participants are detected in a broad area within a radio frequency lobe detection zone. These current methods of detection are thus limited to a broad area inside the field making them incapable of providing highly precise results. For example, many current racing detection systems utilize mats that are placed on the ground at a location where participants will cross, such as the start and/or finish line of a foot race. Mat systems are notorious for not providing precise crossing times, since they obtain detections in a broad area above the mat sometimes called a "bubble". This lack of precision can be problematic in trying to sort out the order of crossings when multiple participants are present within the "bubble" at the same time. Mats can also be limited by their length, which can result in a restricted bottleneck at the start or finish line, and which makes them difficult to use in races requiring wide start or finish lines (e.g. where the race includes thousands of participants). Finally, mats are cumbersome and suffer from the drawback of frequently requiring multiple adjustments to obtain an optimum location, which can use up valuable pre-race setup time.

Other current racing detection systems utilize phased array antennae. While providing additional accuracy, these systems are expensive, and require multiple antennae together with sophisticated software to decode and interpolate the signals received from these antennae.

It is therefore desirable to provide inexpensive and easy to use methods and apparatus which provide precise participant tag crossing times that may be deployed at wide sections of a race course and that are easy to install, use and remove. Embodiments of the subject technology address these issues.

SUMMARY OF THE INVENTION

The present invention provides methods and apparatus for obtaining precise crossing times of participants in a race using one or more mobile radio frequency identification (RFID) based antennae located on towers positioned at one or more locations along a course such as a race course. In embodiments of the invention, such a tower may include an antenna that is capable of detecting RFID participant tags that enter a ninety degree (90°) detection area. In such embodiments, the tower may be located on a side of a race course at a crossing line of the race course such as, without limitation, a start or finish line. In such embodiments, the tower may be turned so that the antenna is positioned at an angle of approximately forty-five degrees (45°) relative to the crossing line of the race course, which is also approximately forty-five degrees (45°) from the adjacent generally perpendicular side of the course. In such embodiments, this positioning establishes the detection zone as a ninety degree (90°) area between the crossing line and the side of the race course.

In some embodiments, such a tower and antenna may be turned such that the ninety degree (90°) detection area faces the incoming participants, as they approach the crossing line. These embodiments are useful when the participant is wearing an RFID tag that may be detected from the front of the participant. In such embodiments, a participant's RFID tag may be detected as soon as it enters the detection zone, and continues to be detected until it exits the zone at the crossing line. In these embodiments, the last detection (the "last tag seen") is the position of the tag at the crossing line. Thus, the hardware and software associated with the antenna may be set to record and/or transmit the time of the "last tag seen" as the time when the tag actually crossed the line. This provides a highly accurate detection of the precise moment that the tag crossed the line.

In other embodiments, such a tower and antenna may be turned such that the ninety degree (90°) detection area faces the departing participants as they travel across and away from the crossing line. These embodiments are useful when the participant is wearing an RFID tag that may be detected from the back of the participant. In such embodiments, a participant's RFID tag may be detected as soon as it enters the detection zone at the crossing line, and continues to be detected until it exits the zone. In these embodiments, the first detection (the "first tag seen") is the position of the tag at the crossing line. In these embodiments, the hardware and software associated with the antenna may be set to record and/or transmit the time of the "first tag seen" as the time when the tag actually crossed the line. This also provides a highly accurate detection of the precise moment that the tag crossed the line.

It is to be appreciated that in some embodiments, two towers may be provided at the same crossing line, to obtain accurate readings from all participants, whether the RFID tag is detectable from the front or the back of the participant. In such embodiments, both towers may be provided on the same side of a course, or they may be provided on opposite sides. Each is angled at forty-five degrees (45°), with one antenna facing toward incoming participants, and the other antenna facing toward departing participants. It is to be appreciated that the tower facing the incoming participants will make detections of participants wearing tags on the front as they approach the crossing line until they reach it, and that the tower facing the departing participants will make detections of participants wearing tags on the back as soon as the participants cross the line and for some time afterwards until they exit the zone.

In some embodiments utilizing two towers, the RFID tags of participants may be detected by both towers, such as, for example, if the RFID tag is affixed to a participant's hat or shoe. In these situations, readings from both towers may be collected and used to determine a highly precise time of crossing the line. In many embodiments utilizing two towers, RFID tags on the backs of participants will still be read by an antenna facing the incoming participants, and the RFID tags on the fronts of participants will still be read by an antenna facing the departing participants, resulting in highly accurate reads.

By way of example and without limitation, two antennae are useful for doing first and last tag for cycling races. When set to last tag seen, it pre-energizes the RFID making the RFIC more responsive thus allowing better performance. In cycling competitions there are many bikes passing, such that pre-energizing the chip is useful. On the other hand, for road running foot races, first tag seen provides satisfactory performance because the tags pass slowly.

In most embodiments, the ninety degree (90°) detection area for each tower is large. As a result, one or more towers may be used to obtain detections at long crossing lines in a course, such as a start or finish line of a foot race course involving thousands of participants, without any loss of detection accuracy.

It is to be appreciated that variances in antennae may cause the detection zone to cover a range of more or less than ninety degrees (90°), but that in all circumstances, the detection zone has defined edges, and one of those edges is to be aligned with the crossing line to be monitored. This may result in an antenna being pointed in a direction that may be more or less than forty-five (45°) from the crossing line, so long as one edge of the detection zone is along the crossing line in order to accurately detect RFID bibs as they cross the line.

In one aspect of the subject technology, a racing detection system is disclosed. The system comprises: a pair of mobile RFID-based towers positioned at a start/finish line or waypoint of a race, wherein the towers respectively face away from each other at opposing 45 degree angles and wherein a first tower is set to first tag seen and a second of the towers is set to last tag seen; and a computer in communication with the pair of RFID-based towers, wherein the computer is configured to determine a detection time of a tag crossing the start/finish line or waypoint of the race based on the detection of tags entering a zone triggering detection of first tag seen criteria and detection of tags entering a zone triggering detection of last tag seen.

It is therefore an object of the present invention to provide methods and apparatus for obtaining highly accurate detection, recording and transmission of crossing times of participant RFID tags in racing or timed events.

It is also an object of the present invention to provide methods and apparatus for obtaining highly accurate detection, recording and transmission of crossing times of participant RFID tags in racing or timed events whether the participant is wearing an RFID tag that is readable from the front or the back.

It is also an object of the present invention to provide methods and apparatus for obtaining highly accurate detection, recording and transmission of crossing times of multiple participant RFID tags in racing or timed events.

It is also an object of the present invention to provide methods and apparatus for obtaining highly accurate detection, recording and transmission of crossing times at wide crossing lines of racing or timed events.

Additional objects of the invention will be apparent from the detailed descriptions and the claims herein.

BRIEF DESCRIPTION OF THE DRAWINGS

The detailed description of some embodiments of the invention is made below with reference to the accompanying figures, wherein like numerals represent corresponding parts of the figures.

DETAILED DESCRIPTION

Figure 1:
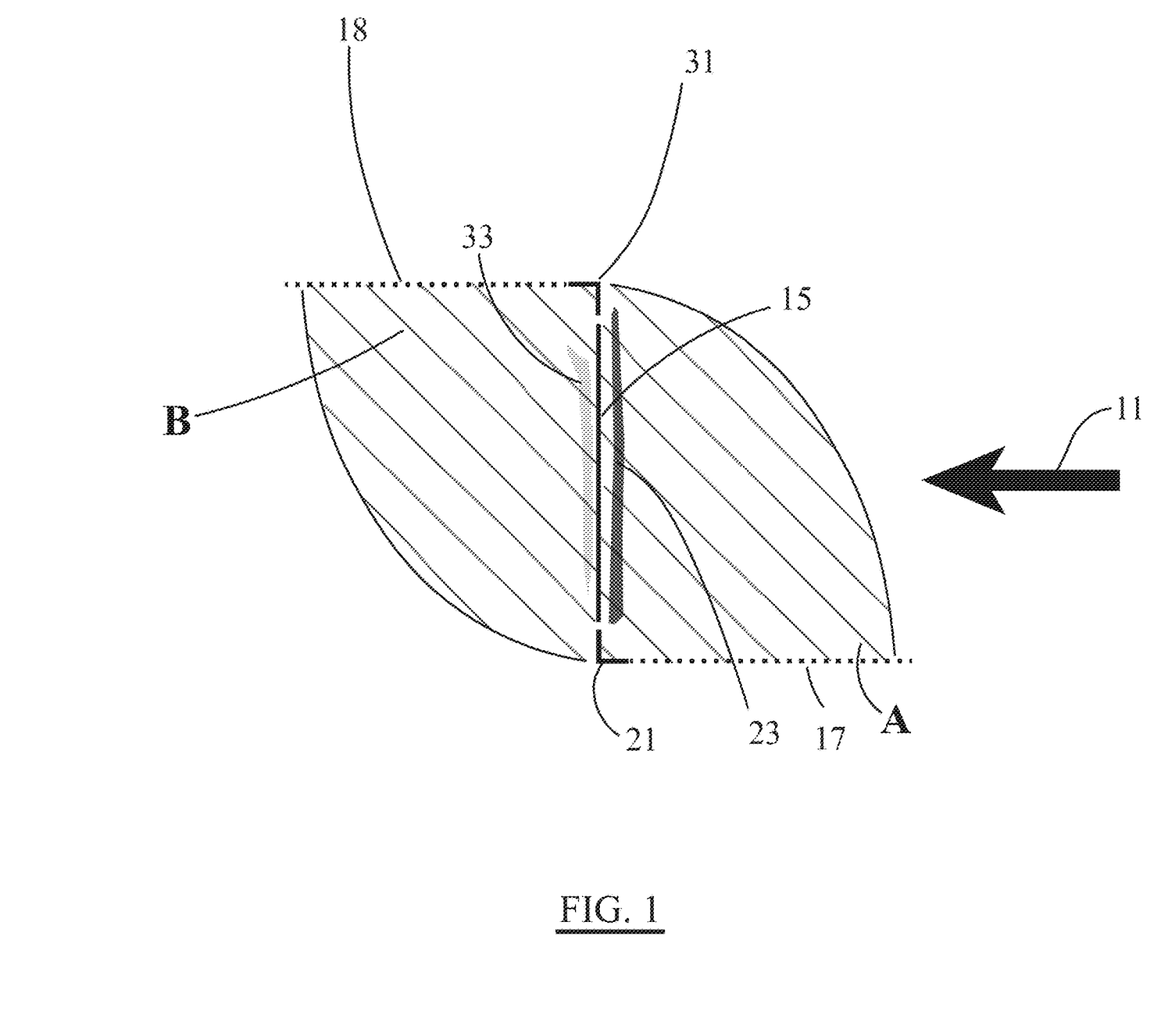
FIG. 1 is a diagrammatic view of a racing tracking system according to an exemplary embodiment.
Figure 7:
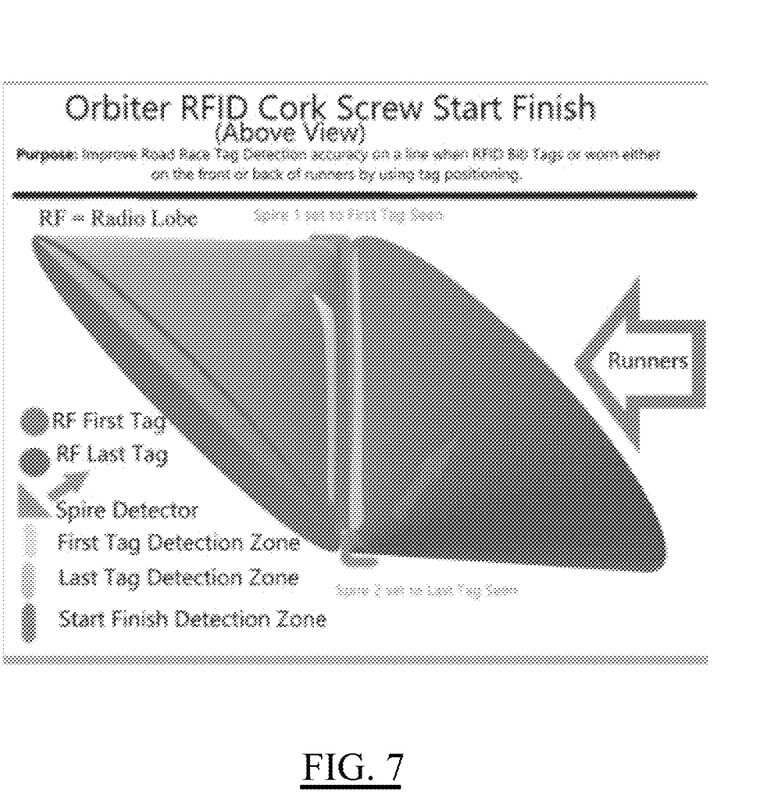
FIG. 7 is a diagrammatic view of a racing tracking system according to an exemplary embodiment.

Referring to the drawings wherein like reference characters designate like or corresponding parts throughout the several views, and referring particularly to the view of FIGS. 1 and 7, it is seen that these illustrated embodiments of the disclosed invention provide a racing tracking system and process that includes a pair of RFID-based tower units connected to a computer. The tower units are positioned to provide redundancy of detection so that the front of the racer and the rear of the racer (where bibs may be worn) are detected. As will be appreciated, the redundancy of RFID-based tower unit detection of front and rear worn bibs in these embodiments improves on the accuracy of a racer's position being confirmed.

Figure 2A:
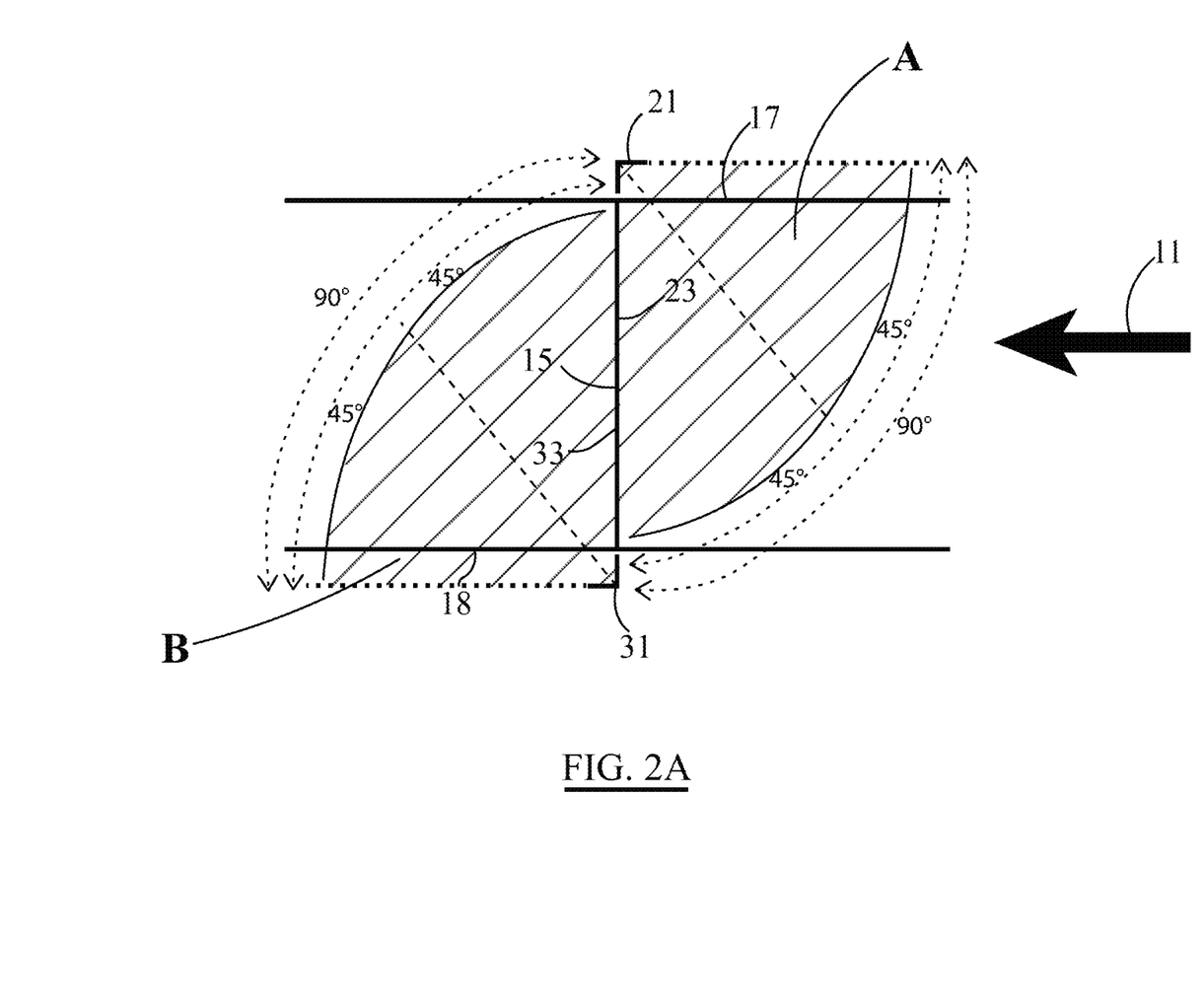
FIG. 2A is a diagrammatic view of an alternative embodiment of the present invention.

With reference to the embodiment of FIG. 2A, participants (in this case runners) travel from right to left 11 across a line 15 along the course. The course has a right side boundary 17 and a left side boundary 18 that are generally parallel to each other, and generally perpendicular to line 15 crossing the course. In the illustration of FIG. 2A, line 15 is shown as a finish line, but it is to be appreciated that in other embodiments, line 15 could be any important designated line along the race, such as without limitation a starting line, a turnaround line, or some other mid-race line or way point.

In the embodiment of FIG. 2A, a first tower 20 is provided at one end of line 15 at the right side boundary 17 of the course. A first antenna 21 located on first tower 20 is oriented at an angle of approximately forty-five degrees (45°) from line 15 so as to face in the general direction of incoming participants. When pointed in this direction, antenna 21 establishes a detection zone "A" covering a ninety degree (90°) area bounded by line 15 at one end, and bounded along an edge of the course (in this case along the right side boundary 17) at the other end. If first antenna 21 is located on the edge of the boundary 17, then an edge of detection zone "A" would be on boundary 17. First antenna 21 detects participants having RFID bibs that are readable from the front, such as, for example, RFID bibs affixed to the front of a shirt, the front of a pair of pants, on a cap, or on a shoe. As participants with front-readable RFID bibs enter zone "A", the bibs are detected by first antenna 21. Antenna 21 detects each bib for the entire time it is in zone "A". When the bib exits zone "A", the last detection (last tag read) indicates the time when the bib crossed the line 15. This information may be recorded and/or transmitted to a remote computer system using wired or wireless communications.

In the illustrated embodiment of FIG. 2A, a second tower 30 is provided at the opposite end of line 15 at the left side boundary 18 of the course. A second antenna 31 on second tower 30 is oriented at an angle of forty-five degrees (45°) from line 15 such that it faces in the direction of departing participants. When pointed in this direction, antenna 31 establishes a detection zone "B" covering a ninety degree (90°) area bounded by line 15 at one end, and bounded along an edge of the course (in this case left side 18) at the other end. If second antenna 31 is located on the edge of the boundary 18, then an edge of detection zone "B" would be on boundary 18. Second antenna 31 detects participants having RFID bibs that are readable from the back, such as, for example, RFID bibs affixed to the back of a shirt, the back of a pair of pants, on a cap, or on a shoe. As participants with back-readable RFID bibs enter zone "B", the bibs are detected by second antenna 31. Antenna 31 detects each bib for the entire time it is in zone "B". When the bib first enters zone "B", the first detection (first tag read) indicates the time when the bib crossed the line 15. This information may be recorded and/or transmitted to a remote computer system using wired or wireless communications.

Figure 2B:
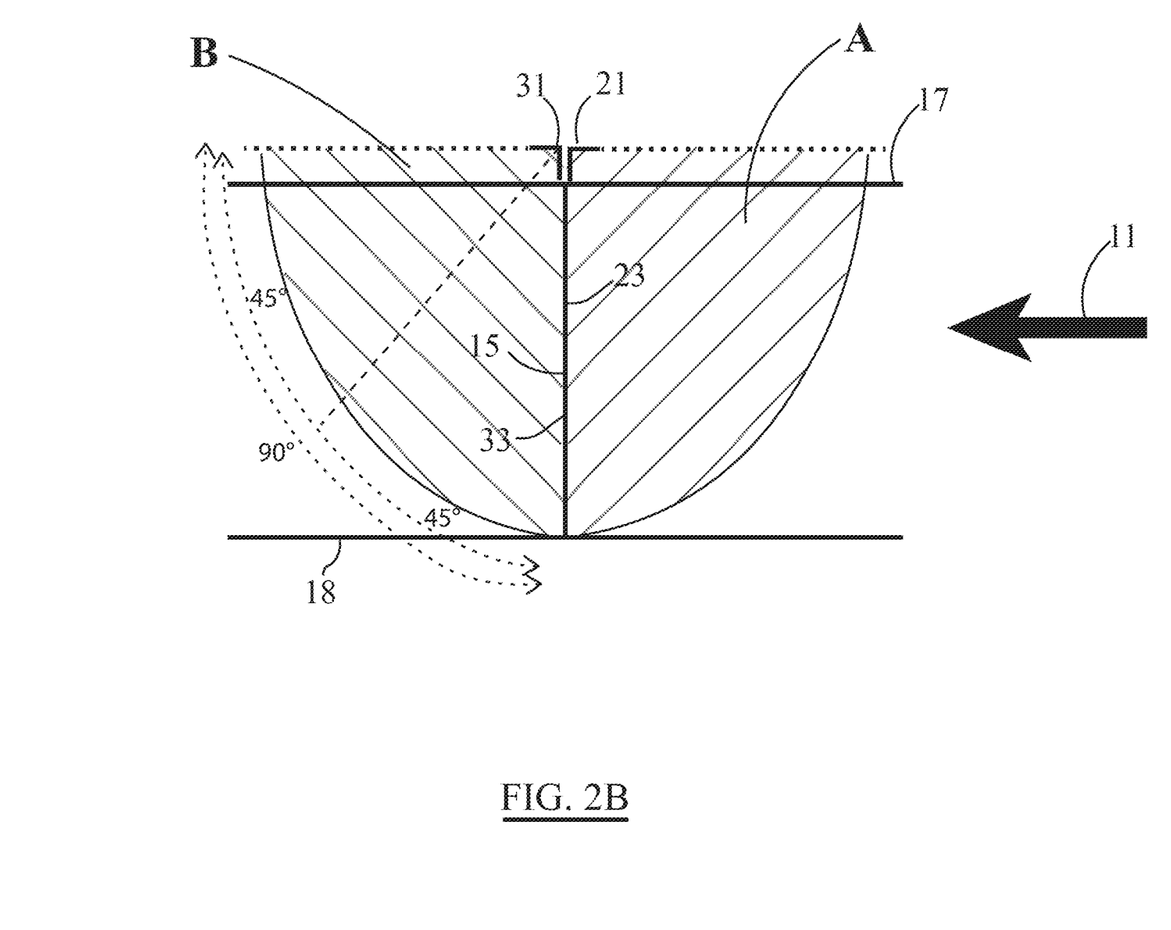
FIG. 2B is a diagrammatic view of an alternative embodiment of the present invention.

It is to be appreciated that in some embodiments (e.g. FIG. 2B), second tower 30 may be on the same side of the course as first tower 20. In these embodiments, the first tower 20 and antenna 21 is oriented at an angle of approximately forty-five degrees (45°) from line 15 such that it faces toward incoming participants which are detected in zone "A", and second tower 30 and antenna 31 is oriented at an angle of approximately forty-five degrees (45°) from line 15 such that it faces departing participants which are detected in zone "B".

Figure 3A:
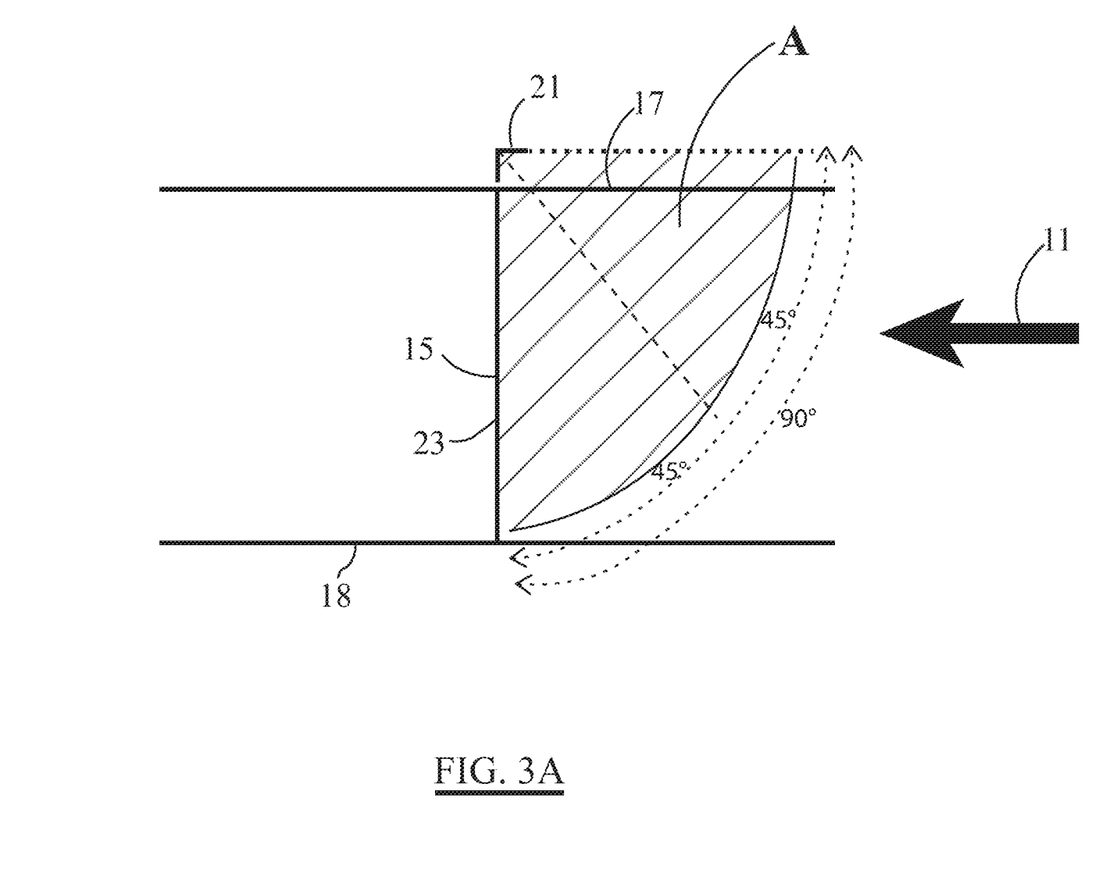
FIG. 3A is a diagrammatic view of an alternative embodiment of the present invention.
Figure 3B:
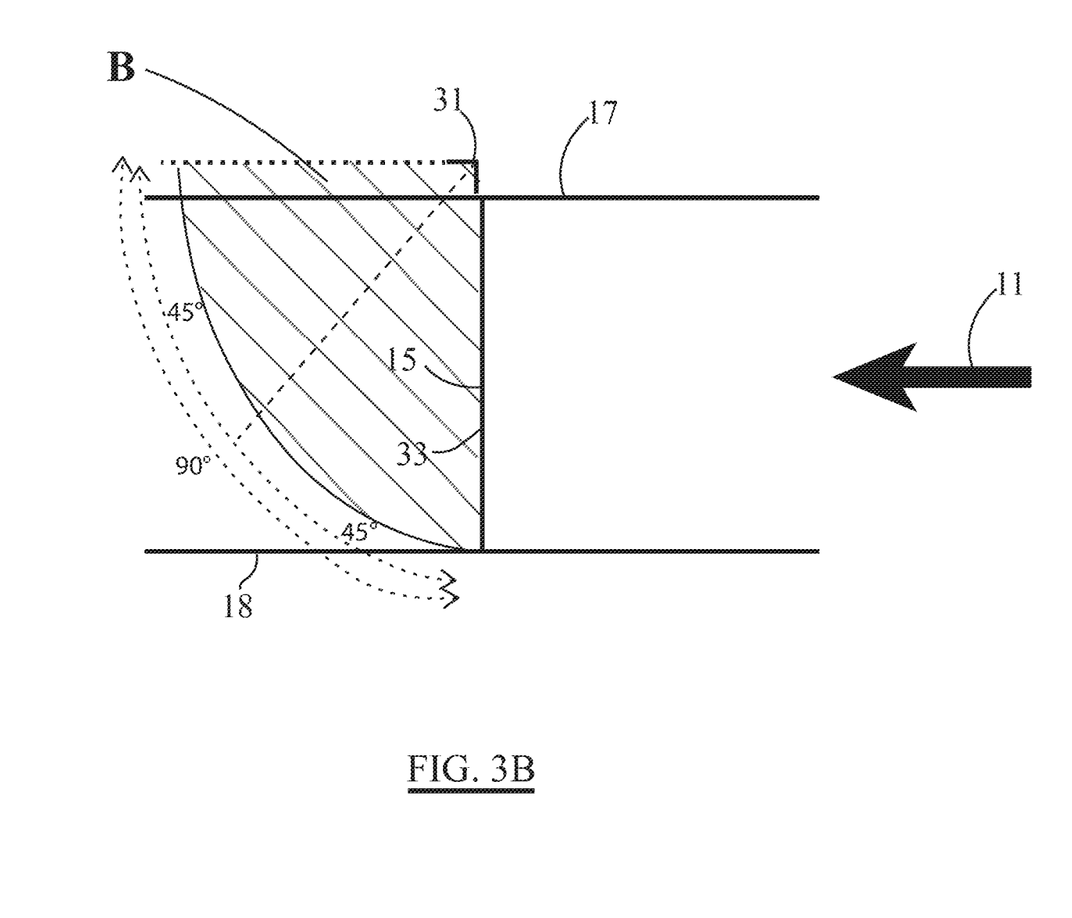
FIG. 3B is a diagrammatic view of an alternative embodiment of the present invention.

In other embodiments, such as those illustrated in FIGS. 3A and 3B, a single tower system may be used. In these embodiments, only one tower 20 with antenna 21 may be provided at a given crossing line 15. Such single tower systems are often suitable, especially at way points on a course, since RFID tags are often readable regardless of whether they are displayed on the fronts or the backs of participants. As shown in FIG. 3A, tower 20 and antenna 21 may be oriented at a forty-five degree (45°) angle facing toward incoming runners as they approach line 15, to detect front-detectable bibs. The embodiment of FIG. 3A is commonly used since most participants wear their RFID bibs on the front for identification by bystanders, for race photography, and the like. Alternatively, as shown in FIG. 3B, tower 20 and antenna 21 may be oriented at a forty-five degree (45°) angle facing departing runners from and after the cross line 15, to detect rear-detectable bibs.

Aspects of the subject technology provide improved detection rates for RFID tags that are orientated in different positions to a RFID reader where the detection is to occur on a line such as start finish or way point in a race. Aspects of the subject technology detect both front and rear surfaces of a racing body where a tag may be positioned as well as positions the detection on the line for improved accuracy rather than inside the field which is less accurate.

With directional antennas the detection beam emanates from the antenna in a ninety (90) degree pattern. However, it is to be appreciated that variances in antennae may cause the detection zone to cover a range of more or less than ninety degrees (90°), but that in all circumstances, the detection zone has defined edges, and one of those edges (e.g. 23 or 33) is to be aligned with the crossing line 15 to be monitored. This may result in an antenna being pointed in a direction that may be more or less than forty-five (45°) from the crossing line 15, so long as one edge of the detection zone (e.g. 23 or 33) is along the crossing line in order to accurately detect RFID bibs as they cross the line.

Figure 4:
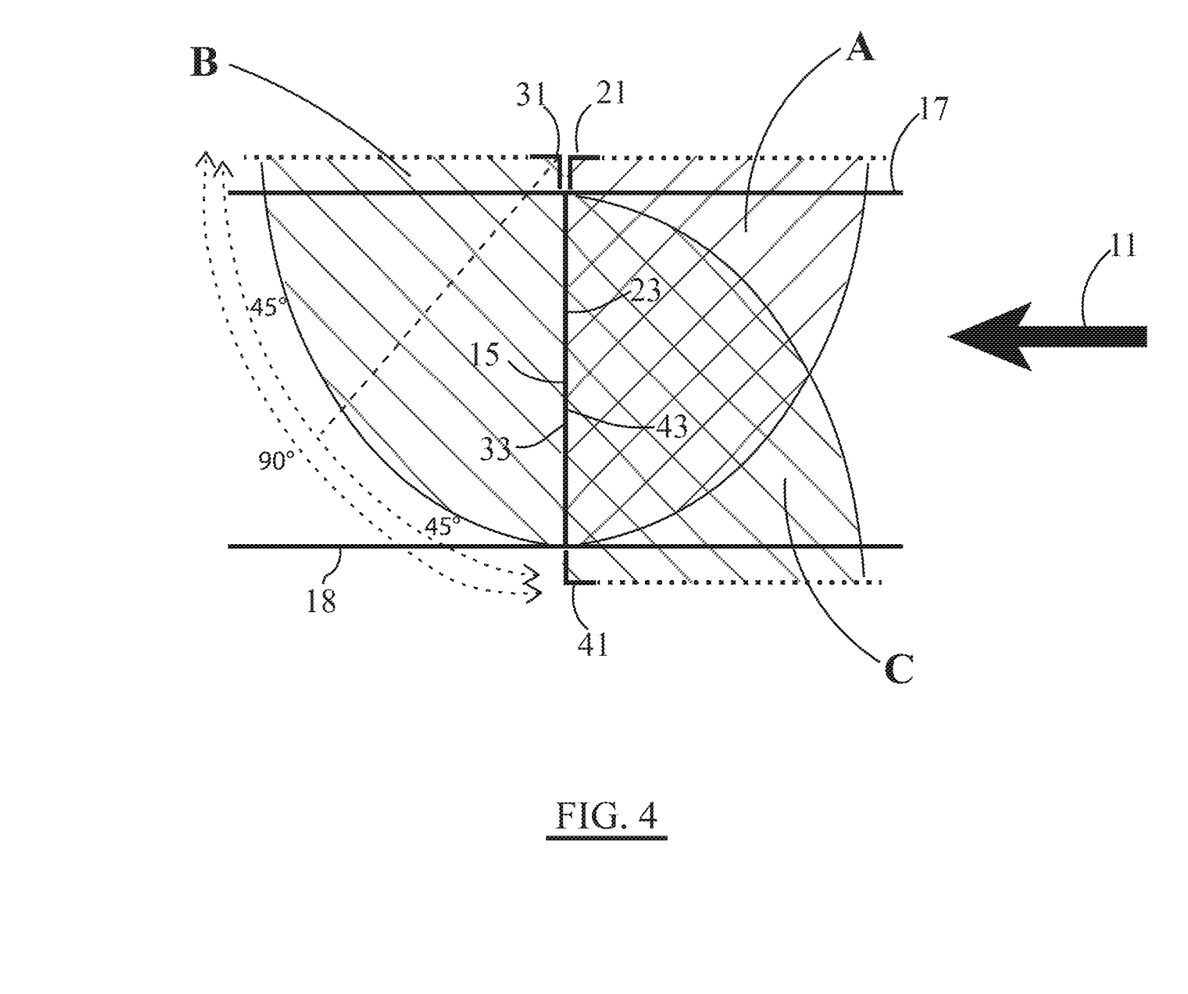
FIG. 4 is a diagrammatic view of an alternative embodiment of the present invention.

In an exemplary embodiment shown in FIG. 4, two antennas 21, 31 on one side of the line 15, and another 41 on the other side of the line, are facing at opposing 45 degree angles and one may be set to last tag seen, and the other set to first tag seen such that these detection zones overlap. As a result, for the first time without the use of phased array antennas, there is precision detection of tags along the line possible. This means greater economy for detections as less expensive equipment is used to accomplish the same accuracy as phased detection technology.

The tower units and computer have respective software which translates detection of RFID tags worn on racers as they enter zones of detection. In the underlying processes, the system may use either first tag detection seen or last tag detection seen modes. The detection process utilizes cooperative reader operation. With reference to FIGS. 1, 2A-2B and 7, as tags enter an incoming (spire 2) detection zone "A", the process begins updating its most recent detection time each time a tag is detected. When the tag is no longer detected for timeout period 'decay time', the last detection is utilized to determine the 'leave' time of the tag. As tags enter an outgoing (spire 1) detection zone "B", the first detection time is utilized to determine the 'enter' time. The process orders the 'enter' time and the 'leave' time from the two detectors based on a parameter defined by the operator, which could be, for example, spire 1 then spire 2 (zone B then zone A), or spire 2 then spire 1 (zone A then zone B). The top detection of the ordering is the tag detection time for the detection zone. Any object (for example, a runner, a racer, a vehicle, a bicycle or other mounted object) associated with the tag is then assigned this as its detection time. Zones may be seen in the attached figures.

In a physical embodiment, the system may include one or more of the RFID-based towers and a computer in communication with the one or more of the RFID-based towers. The computer may be hardwired to the tower(s) or there may be wireless telecommunication link between tower(s) and computer. The RFID tower(s) may comprise a circular directional antenna, RFID detectors, and RFID antenna. In some embodiments, the system may use two or more antennas without a server. In some embodiments, the system may use slave antennas with a server. In some embodiments, the antennas may be mounted on poles, mats or overhead structures. The system may be on a mobile form factor.

Figure 5:
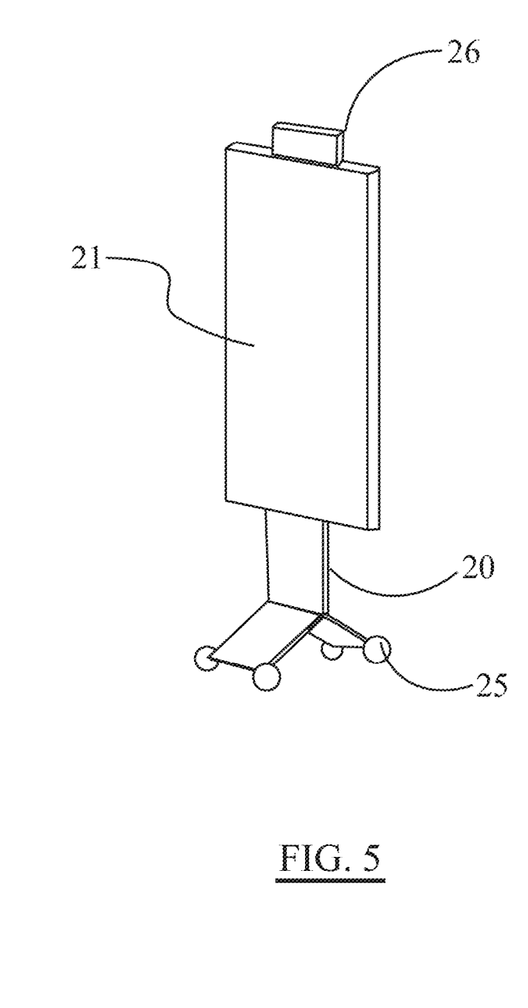
FIG. 5 is a perspective view of an embodiment of a tower of the present invention.

An exemplary embodiment of a tower 20 and antenna 21 is illustrated in FIG. 5. This exemplary embodiment shows a tower structure 20 supporting an antenna 21. In some embodiments, tower 20 may be provided with wheels 25 and a handle 26 to facilitate easy movement to a remote location along a course. In some embodiments, antenna 21 may be mounted on tower 20 at a forty-five degree (45°) angle, making it easy and convenient to roll the tower 20 up to a side of a course 17, 18 adjacent to a line 15 so as to immediately place antenna 21 in a proper orientation for reading RFID tags. In other embodiments, antenna 21 may be pivotally mounted on the tower 20 using a swivel (not shown), allowing antenna 21 to be rotated and pointed in a desired direction without changing the position of the base and/or wheels. It is to be appreciated that although the antenna 21 in the illustrated embodiment appears as a flat panel, antenna 21 may be provided in any of a number of other configurations, all of which are capable of reading RFID tags in a ninety degree (90°) zone extending out from the antenna.

Figure 6:
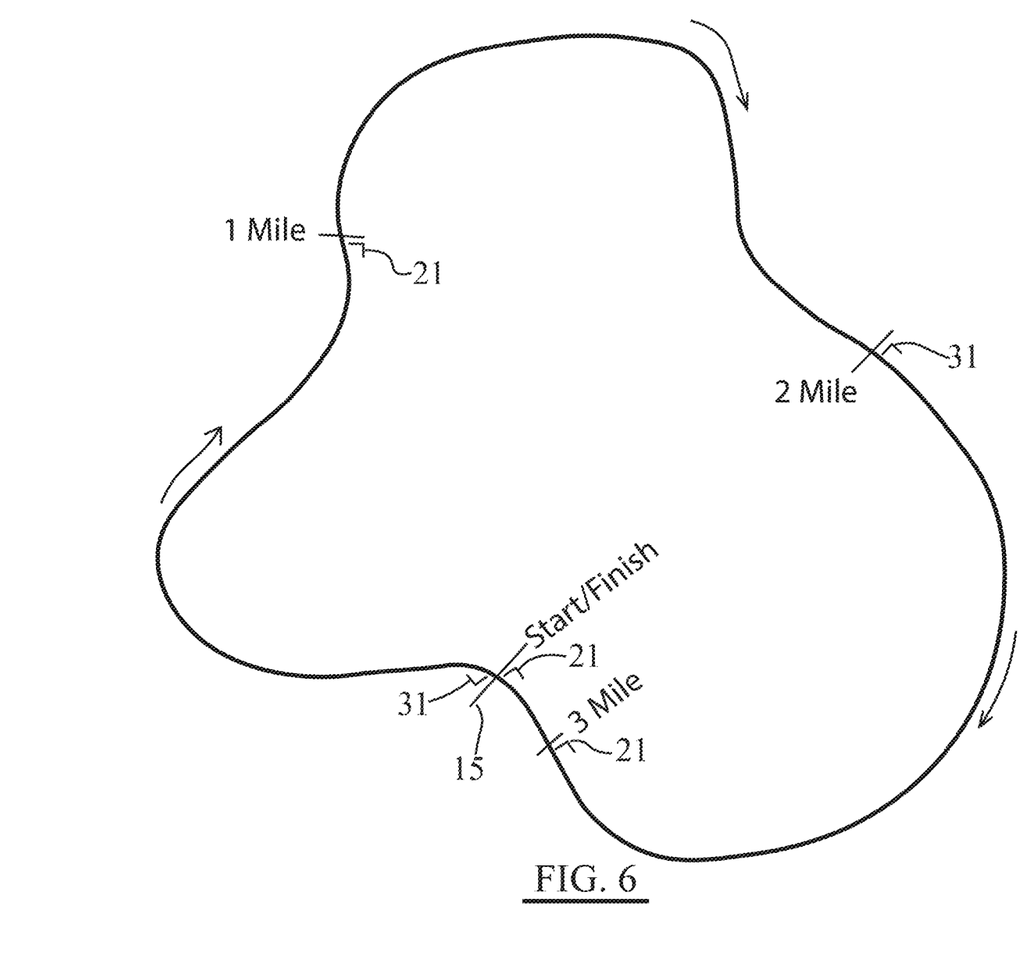
FIG. 6 is a diagrammatic environmental view of an embodiment of the present invention deployed on a 5K race course.

An exemplary diagram of a 5K footrace course is shown in FIG. 6 where runners travel in a clockwise direction. In this diagram, a pair of antennae 21, 31 are provided at the start/finish line 15. Front facing RFID bibs are read by antenna 21 which faces oncoming runners, and rear facing RFID bibs are read by antenna 31 as the runners cross and depart from line 15. Many if not all RFID tags will likely be read by both antennae 21 and 31. The last tag read from antenna 21 and/or the first tag read from antenna 31 will accurately reflect when each RFID bib crosses line 15. In the illustrated diagram of FIG. 6, single towers with one antenna are provided at other locations on the course, such as at the 1-mile, 2-mile and 3-mile way points. In the illustrated course, the towers at the 1-mile and 3-mile lines have antennae facing incoming runners, while the tower and antenna at the 2-mile line faces the backs of departing runners. All of the towers and antennae record and/or transmit the RFID tag reads to a central computer for processing, use and display. The central computer uses either first tag reads or last tag reads for the RFID bib crossing times, depending on the orientation of the antenna providing the data.

It is to be appreciated that in other embodiments, a single tower may be used at every crossing line 15, and that each such single tower may face either oncoming or departing runners. In other embodiments, a pair of towers may be used at every crossing line 15, one facing incoming runners, and the other facing departing runners, and that the pairs of towers may be on the same side or on opposite sides of the course. In other embodiments, further redundancy and accuracy may be provided by adding a third or even a fourth tower at each line.

In operation, the course and system may designate a line 15 from which RFID tags are to be detected. It is to be appreciated that line 15 may be a starting line, finish line, turnaround line, way point, or other important place along the course; and that one or more embodiments of the invention may be placed at one or more of these lines. In one embodiment, two opposing antennas may be positioned on the line 15 in forty-five (45) degree opposing directions. The antenna(s) may be calibrated for detections on the line prior to use by presenting a tag to the line to confirm detections occurred within a user defined acceptable range to the line. During the race event, RFID tags are first read by the antenna 21 facing incoming participants, and then read by the antenna 31 facing departing participants. Programming in the system obtains the last tag read from the first antenna 21 which may be compared to the first tag read from the second antenna 31 to determine the precise time that a bib crossed line 15. This crossing time may then be recorded, output and/or displayed as the result for that bib.

Some embodiments may use by different wave bands such as UHF, Microwave, X-Ban, infrared to improve detection positioning. In some embodiments, direction of motion may be detected. This may be used for knowing if the movement is an entry or exit precisely when crossing a line using RF only.

As will be understood, the computing devices in the system may include, but are not limited to, one or more processors or processing units, a system memory, and a bus that couples various system components including the system memory to the processor.

The system memory could include one or more computer system readable media in the form of volatile memory, such as a random-access memory (RAM) and/or a cache memory. The system memory may include at least one program product having a set (e.g., at least one) of program modules that are configured to carry out the functions of embodiments of the invention.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

It is to be appreciated that different versions of the invention may be made from different combinations of the various features described above, all of which may be used for detection of line crossings at races, timed events, exits or entries to rooms, buildings or arenas, or other places where precise detection of a line crossing is desired. It is to be understood that other variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An RFID bib detection system comprising at least one tower located at a side boundary of a course, the side boundary being generally perpendicular to a line crossing the course, the tower supporting an antenna having a ninety degree zone of detection wherein the antenna is pointed at an angle of approximately forty-five degrees relative to said side boundary and to said crossing line for detecting RFID bibs of participants that pass through said zone;

wherein said antenna faces toward participants approaching said crossing line such that an edge of said zone of detection is along said crossing line;

wherein a last read for each RFID bib in said zone reflects a time when such bib crossed the line;

wherein said antenna faces toward participants moving away from said crossing line such that an edge of said zone of detection is along said crossing line; and wherein a first read for each RFID bib in said zone reflects a time when such bib crossed the line.

2. The RFID bib detection system of claim 1 wherein said last read time is wirelessly transmitted to a central computer.

3. The RFID bib detection system of claim 1 wherein said first read time is wirelessly transmitted to a central computer.

4. An RFID bib detection system comprising a pair of towers, each tower located at a side boundary of a course, each such side boundary being generally perpendicular to a line crossing the course, each tower supporting an antenna having its own ninety degree zone of detection wherein each antenna is pointed at an angle of approximately forty-five degrees relative to said crossing line, each antenna for detecting RFID bibs of participants that pass through each such zone;

wherein a first of said pair of antennas faces toward participants approaching said line such that an edge of a first zone of detection is along said crossing line, and wherein a second of said pair of antennas faces toward participants departing from said line such that an edge of a second zone of detection is along said crossing line; and wherein a last read for each RFID bib in said first zone reflects a time when such bib crossed the line, and wherein a first read for each RFID bib in said second zone reflects a time when such bib crossed the line.

5. The RFID bib detection system of claim 4 wherein said read times are wirelessly transmitted to a central computer.

6. The RFID bib detection system of claim 4 wherein both of said pair of towers are located on the same side boundary of said course adjacent to said crossing line.

7. The RFID bib detection system of claim 4 wherein said pair of towers are located on opposite side boundaries of said course adjacent to said crossing line.

8. An RFID bib detection system comprising at least one tower located at a side boundary of a course adjacent to a line crossing the course, the tower supporting an antenna having a zone of detection with at least one defined edge wherein the antenna is pointed at an angle relative to said crossing line such that said defined edge of said zone of detection is along said crossing line for detecting RFID bibs of participants that pass through said zone and across said line;

a second tower located at a side boundary of a course adjacent to said crossing line, the second tower supporting a second antenna having a second zone of detection with at least one second defined edge wherein the second antenna is pointed at an angle relative to said crossing line such that said second defined edge of said second zone of detection is along said crossing line for detecting RFID bibs of participants that pass through said second zone and across said line; and wherein said first antenna faces toward participants approaching said crossing line such that a last read for each RFID bib in said first zone reflects a time when the bib crossed the line, and wherein said second antenna faces toward participants moving away from said crossing line such that a first read for each RFID bib in said second zone reflects a time when the bib crossed the line.

9. The RFID bib detection system of claim 8 wherein said antenna faces toward participants approaching said crossing line such that a last read for each RFID bib in said zone reflects a time when the bib crossed the line.

10. The RFID bib detection system of claim 8 wherein said antenna faces toward participants moving away from said crossing line such that a first read for each RFID bib in said zone reflects a time when the bib crossed the line.

11. The RFID bib detection system of claim 8 wherein both of said towers are located on the same side boundary of said course adjacent to said crossing line.

12. The RFID bib detection system of claim 8 wherein said towers are located on opposite side boundaries of said course adjacent to said crossing line.

* * * * *